United States Patent
Schenk et al.

(10) Patent No.: US 8,365,163 B2
(45) Date of Patent: Jan. 29, 2013

(54) METHOD FOR CONFIGURING A COMPUTER PROGRAM

(75) Inventors: Rene Schenk, Tamm (DE); Bjoern Beuter, Hirrlingen (DE); Klaus Schneider, Ludwigsburg (DE); Bernd Illg, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 1061 days.

(21) Appl. No.: 10/588,596

(22) PCT Filed: Jan. 24, 2005

(86) PCT No.: PCT/EP2005/050289
§ 371 (c)(1),
(2), (4) Date: Jun. 8, 2007

(87) PCT Pub. No.: WO2005/076129
PCT Pub. Date: Aug. 18, 2005

(65) Prior Publication Data
US 2007/0261028 A1    Nov. 8, 2007

(30) Foreign Application Priority Data
Feb. 5, 2004 (DE) .......................... 10 2004 005 730

(51) Int. Cl.
*G06F 9/44* (2006.01)
*G06F 9/445* (2006.01)
(52) U.S. Cl. .................... 717/175; 717/169; 717/174
(58) Field of Classification Search ........... 717/174–175
See application file for complete search history.

(56) References Cited

U.S. PATENT DOCUMENTS

| | | | | |
|---|---|---|---|---|
| 5,005,136 A * | 4/1991 | Van Berkel et al. | .......... | 716/103 |
| 5,872,977 A * | 2/1999 | Thompson | .................... | 717/122 |
| 6,295,561 B1 * | 9/2001 | Nagy | ............................ | 709/246 |
| 6,370,682 B1 * | 4/2002 | Eckardt et al. | ................ | 717/141 |
| 6,681,391 B1 * | 1/2004 | Marino et al. | ................ | 717/175 |
| 6,877,035 B2 * | 4/2005 | Shahabuddin et al. | ........ | 709/226 |
| 7,150,003 B2 * | 12/2006 | Naumovich et al. | .......... | 717/108 |
| 7,234,135 B2 * | 6/2007 | Bollhoefer et al. | ............ | 717/154 |
| 7,350,191 B1 * | 3/2008 | Kompella et al. | ............. | 717/108 |
| 7,490,157 B2 * | 2/2009 | Huang | .......................... | 709/230 |
| 2001/0056572 A1 * | 12/2001 | Richard et al. | .................. | 717/11 |
| 2002/0040069 A1 | 4/2002 | Pramberger | | |

(Continued)

FOREIGN PATENT DOCUMENTS

| | | |
|---|---|---|
| JP | 4 55938 | 2/1992 |
| JP | 6 195214 | 7/1994 |

(Continued)

*Primary Examiner* — Li B Zhen
*Assistant Examiner* — Ryan Coyer
(74) *Attorney, Agent, or Firm* — Kenyon & Kenyon LLP

(57) ABSTRACT

To permit particularly easy and flexible configuration of a computer program including at least one functional unit, a method is provided which includes the following steps: creation of at least one implementation-independent configuration data file and/or alteration of information filed in the at least one implementation-independent configuration data file; automatic set-up and/or automatic update of configuration data, stored in a configuration data container, as a function of the information filed in the at least one implementation-independent configuration data file; automatic generation of at least one implementation-dependent configuration data file as a function of the configuration data stored in the configuration data container; and automatic configuration of the at least one functional unit as a function of information filed in the at least one implementation-dependent configuration data file.

16 Claims, 2 Drawing Sheets

U.S. PATENT DOCUMENTS

| | | | |
|---|---|---|---|
| 2002/0040469 A1* | 4/2002 | Pramberger | 717/121 |
| 2002/0199170 A1 | 12/2002 | Jameson | |
| 2003/0056204 A1* | 3/2003 | Broussard | 717/140 |
| 2003/0110024 A1* | 6/2003 | Broussard | 704/200 |
| 2003/0192036 A1* | 10/2003 | Karkare et al. | 717/158 |
| 2004/0015502 A1* | 1/2004 | Alexander et al. | 707/100 |
| 2004/0015838 A1 | 1/2004 | Watase et al. | |
| 2007/0245332 A1* | 10/2007 | Tal et al. | 717/168 |

FOREIGN PATENT DOCUMENTS

| | | |
|---|---|---|
| JP | 2002 229783 | 8/2002 |
| JP | 2004 15838 | 1/2004 |

* cited by examiner

METHOD FOR CONFIGURING A COMPUTER PROGRAM

FIELD OF THE INVENTION

The present invention relates to a method for configuring a computer program including at least one functional unit. It also relates to a software system for configuring a computer program including at least one functional unit.

BACKGROUND INFORMATION

Modern computer programs are predominantly programmed in such a way that they are useable in as broad a range of application as possible. The range of application is determined on one hand by the functionalities made available, which in turn should cover as many user desires as possible, and on the other hand by the underlying hardware on which the computer program is to run. In this context, the underlying hardware denotes different computer systems which are used in different areas, are constructed of different components (e.g., processors or bus systems), and/or have different peripherals.

Different functionalities can result from different conditions of the underlying hardware or from different user desires. Adaptation, and therefore specialization, of a computer program to underlying hardware and to specific user desires includes a so-called configuration of the computer program.

For example, a configuration includes the activation or deactivation of individual functions of the computer program, the setting of starting values for certain variables or the preselecting and specifying of certain variable types.

It is well-known to declare the variables and functions used in a computer program in a so-called header file, and to configure the computer program by changing individual variables or function designators in the header file. For example, it is possible to assign a special function to a function designator used in the computer program and declared in the header file, depending upon a specific configuration.

Computer programs are usually created in a so-called high-level programming language, e.g., C, C++, Scheme or JAVA. A computer program created in a high-level programming language is usually referred to as source code. To permit execution of such a computer program on a computer, a so-called machine code must be generated from the source code, the machine code containing instructions which are executable by the processor of the computer. Machine code can be generated by so-called interpretation or compilation of the source code.

Typically, a computer program includes a plurality of functional units. The source code of one or more functional units is stored in a data file. A header file is assigned to one or more such data files. Thus, a computer program is typically made up of a plurality of data files. A configuration of such a computer program, which is accomplished by changes within individual header files, is therefore very unclear and can often only be accomplished by the creator of the source code. In addition, a documentation must be created for all header files, which is very painstaking; even the documentation is for the most part very unclear.

To configure a computer program, it is also known to assign it a special functional unit by which it is possible to configure the entire computer program, e.g., by altering the values of predefined parameters. For example, the functional unit may be launched from within the computer program running, and be executed for configuring the computer program. However, such a functional unit provided for configuring, the computer program only allows a configuration within predefined range limits. A configuration of the computer program, e.g., for adapting the computer program to new hardware or for adapting the computer program to new desires of the user is not possible using such a functional unit. Moreover, the functional unit used for the configuration must be developed specially for the computer program in question, and cannot be used for other computer programs.

Therefore, the object of the present invention is to provide a possibility that allows as clear and flexible a computer-program configuration as possible.

The objective is achieved by a method of the type indicated at the outset, which includes the following steps:

creation of at least one implementation-independent configuration data file and/or alteration of information filed in the at least one implementation-independent configuration data file;

automatic set-up and/or automatic update of configuration data, stored in a configuration data container, as a function of the information filed in the at least one implementation-independent configuration data file;

automatic generation of at least one implementation-dependent configuration data file as a function of the configuration data stored in the configuration data container;

automatic configuration of the at least one functional unit as a function of information filed in the at least one implementation-dependent configuration data file.

Thus, the data determining a configuration is filed independently of an intended, specific implementation, in one or more implementation-independent configuration data files. In particular, the implementation independence of this configuration data file permits an abstract description of the filed information. This makes it possible to file the information relevant for the configuration of the computer program so that it is particularly easy to read, and therefore to markedly simplify the configuration. Because this configuration data file is implementation-independent, it is possible in particular to configure the computer program in a simple manner so that, for instance, the computer program is executable on a new computer system whose exact parameters were not even known yet when the computer program was created.

The configuration data container makes it possible to centrally provide all data relevant for a configuration. At least one implementation-dependent configuration data file is generated automatically with the aid of the configuration data stored in the configuration data container. In the implementation-dependent configuration data file, individual or a plurality of parameter values are put into concrete terms relative to the implementation-independent configuration data file. In such a concretization, for example, relative values are replaced by absolute values. Specific data types or structures may be assigned to individual values or data areas, as well. Consequently, the implementation-dependent configuration data file takes into account implementation-dependent properties, such as one or more programming languages used when programming the source code, or properties of the hardware on which the computer program is intended to run.

The set-up or the updating of the configuration data container with the aid of the information filed in the implementation-independent configuration data files may be carried out using so-called scripts, for example. In this context, a script denotes a sequence of instructions which are executable by a special computer program. Such special computer programs are AWK or Perl, for example. These special computer programs may also be used to generate implementation-dependent configuration data files from the configuration data stored in the configuration data container.

An essential part of the invention is thus the recognition that the configuration of a computer program may be improved decisively by providing between a user (configurator) and the computer program, an abstract description of the configuration to be implemented in the implementation-independent configuration data file, which is taken as the basis of the configuration. With the aid of the implementation-independent configuration data file, an implementation-dependent configuration data file is automatically created which is then utilized for configuring the computer program. The method of the present invention thus makes it possible to specify the information describing a configuration in an abstract and therefore particularly easily readable manner. Moreover, especially high flexibility is achieved due to the independence of any implementation details.

In one advantageous further development of the method, at least one item of dependency information, which describes a dependency on at least two configuration data present in the configuration data container, is automatically generated. The at least one implementation-dependent configuration data file is generated as a function of the at least one item of dependency information.

Dependency information may describe, for example, whether the change of one configuration parameter has an effect on another configuration parameter. For instance, if a resource is reserved exclusively for one functional unit, then it is not available to other functional units during the execution of the functional unit. Using dependency information, it is possible to ascertain which functional units need a specific resource, and therefore cannot run simultaneously. Consequently, dependency information may also be used for resource management.

In one preferred specific embodiment of the method, a plurality of implementation-independent configuration data files is created, and each of the implementation-independent configuration data files is assigned to at least one functional unit. This allows a particularly simple configuration, because the configuration parameters filed as information in the implementation-independent configuration data files can be found and altered especially easily. For example, it is possible to sort the information determining a configuration, thus, the configuration parameters, according to the functionality influenced by it, or according to hardware. Moreover, a particularly simple adaptation of the implementation-independent configuration data files to newly added functional units is thereby made possible. In the simplest case, a special implementation-independent configuration data file is assigned to a newly added functional unit.

A plurality of implementation-dependent configuration data files is advantageously generated, and each of the implementation-dependent configuration data files is allocated to at least one functional unit. Such a structuring of the implementation-dependent configuration data files increases the clarity of the implementation-dependent configuration data files generated. If the source code is structured in such a way that one or more functional units are located in different data files, then an implementation-dependent configuration data file can be allocated to each of the data files of the source code. A particularly lucid structuring may also be achieved by, in each case, assigning one implementation-dependent configuration data file to each implementation-independent configuration data file.

The at least one implementation-dependent configuration data file is preferably generated as a function of at least one property of hardware on which an installation of at least one portion of the configured computer program is to be made possible. For instance, such a hardware property may be the number of processors available or the type and number of sensors connected to the hardware. If such hardware properties are taken into account when generating the implementation-dependent configuration data files, an especially precise configuration of the computer program is then possible. Particularly using dependency information, it is therefore possible, for instance, to automatically create a configuration optimized with regard to execution speed.

In one preferred specific embodiment, the at least one implementation-dependent configuration data file is generated as a function of the result of a plausibility check. For example, a plausibility check may include a check as to whether a resource needed by a functional unit is available at all.

The at least one hardware property is preferably used to carry out the plausibility check. It is thereby possible to greatly increase the degree of automation, and to achieve a reliable configuration of the computer program. For example, if a functional unit provides for an acquisition of measured values, it may be checked whether suitable sensors are present and whether they make available the measuring accuracy demanded. In this case, it is conceivable, for instance, that the sensor is configured automatically.

In a further preferred specific embodiment, a documentation is created automatically. The documentation describes the information filed within the at least one implementation-independent configuration data file and/or the at least one implementation-dependent configuration data file. On one hand, documentations automatically generated in this way increase the maintainability of the computer program, and on the other hand, permit especially easy comprehension of an accomplished configuration. The automatic generation of the documentation ensures that it conforms with the actual configuration. If a new configuration of the computer program is to be carried out, then with the aid of such a documentation, it is possible to determine particularly easily which parameter values must be changed.

Preferably, the at least one implementation-independent configuration data file is created in an XML-based format. XML (Extensible Markup Language) is a standardized meta language which makes it possible to generate structured languages. If the at least one implementation-independent configuration data file is created in an XML-compliant, structured language, then a configuration is facilitated, because such an implementation-independent configuration data file can be read particularly well. Moreover, a configuration data file of this kind can also be read especially well by machine. In particular, a plurality of software tools exists, likewise standardized in part, by which it is possible to edit and process data files created in an XML-based format.

In one preferred specific embodiment of the method, as a function of the configuration data, it is automatically determined whether a functional unit included by the computer program is needed by the computer program, and this functional unit is configured only if the functional unit is needed by the computer program. This facilitates an especially rapid configuration, because only those functional units are actually configured which are really needed in an execution of the configured computer program. Furthermore, the configured computer program thereby takes up as little storage space as possible, since, for example, a translation of source code into machine code is only brought about for those functional units which are actually intended to be used.

SUMMARY OF THE INVENTION

The objective is also achieved by a software system of the type indicated at the outset. In this context, the software system has:
- at least one implementation-independent configuration data file;
- a configuration data container including configuration data and/or means for creating a configuration data container as a function of information filed in the at least one implementation-independent configuration data file;
- means for altering and/or reading out configuration data from the configuration data container;
- means for automatically generating at least one implementation-dependent configuration data file as a function of configuration data stored in the configuration data container; and
- means for automatically configuring the at least one functional unit as a function of information filed in the implementation-dependent configuration data file.

Preferably, the software system has means for carrying out the method of the present invention.

The implementation of the present invention in the form of a software system is of particular importance. In this context, the software system is able to run on a computing element, particularly on a microprocessor, and is suitable for carrying into effect the method according to the present invention. In this case, therefore, the present invention is realized by the software system, so that the software system constitutes the present invention in the same way as the method for whose execution the software system is suitable. The software system is preferably stored in a memory element. The memory element may take the form of a random access memory, read only memory or flash memory. The memory element may also be in the form of a digital versatile disk (DVD), compact disk (CD) or hard disk.

DETAILED DESCRIPTION

Figure 1:
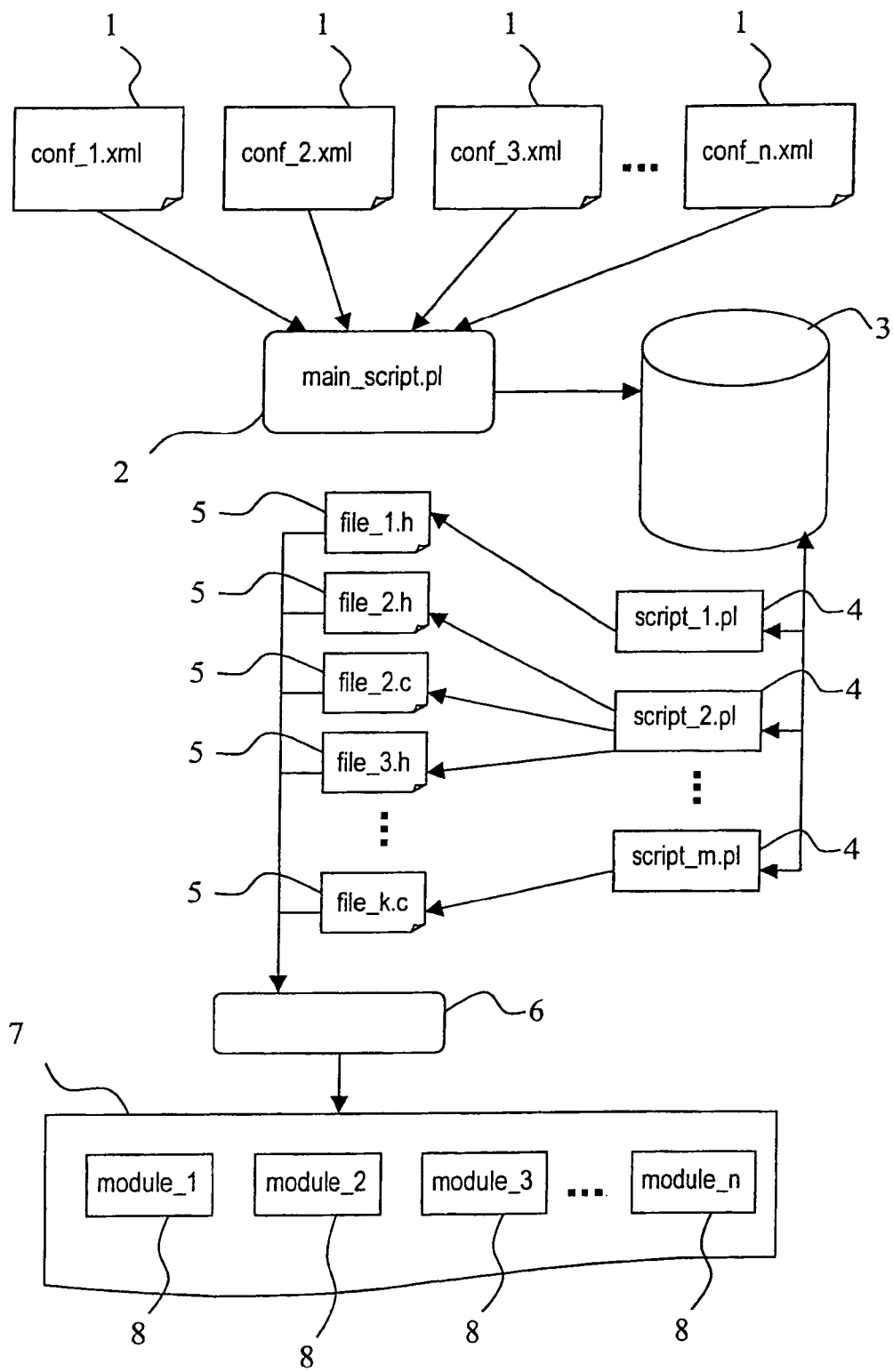
FIG. 1 shows a specific embodiment of a software system for carrying out the method of the present invention.

FIG. 1 shows a software system for carrying out the method of the present invention. The software system has a plurality of implementation-independent configuration data files 1. A file name is assigned to each configuration data file 1. For example, the implementation-independent configuration data files shown in FIG. 1 bear the file names conf_1.xml, conf_2.xml, conf_3.xml through conf_n.xml. The file ending .xml indicates that implementation-independent configuration data files 1 are in an XML-based format. A text file in an XML-based format makes it possible to structure the text file according to specifiable rules. Such a structured text file can be read particularly well manually and by machine and processed.

Implementation-independent configuration data files 1 are fed to a script 2. Script 2 is in the form of a so-called Perl script, for example. Perl is an interpreter language whose syntax is based on programming language C, and which uses utility programs made available by the specific operating system.

Using script 2, implementation-independent configuration data files 1 are read, and the information stored therein is extracted and stored in a configuration data container 3. At the same time, possibly existing dependencies with respect to further configuration scripts 4 are also determined and stored.

Further configuration scripts are represented by reference numeral 4. They are likewise in the form of Perl scripts. It is equally conceivable that one or more of further configuration scripts 4 is an executable computer program (machine code), or exists in another script language, e.g., AWK.

Implementation-dependent configuration data files are denoted by reference numeral 5. For example, implementation-dependent configuration data files 5 are coded in the programming language in which the source code to be configured is also programmed. Such implementation-dependent configuration data files are able to be processed by a compiler 6.

Reference numeral 7 denotes a computer program having a plurality of functional units 8.

The functioning method of the software system according to the present invention is described with reference to the flow chart shown in FIG. 2.

Figure 2:
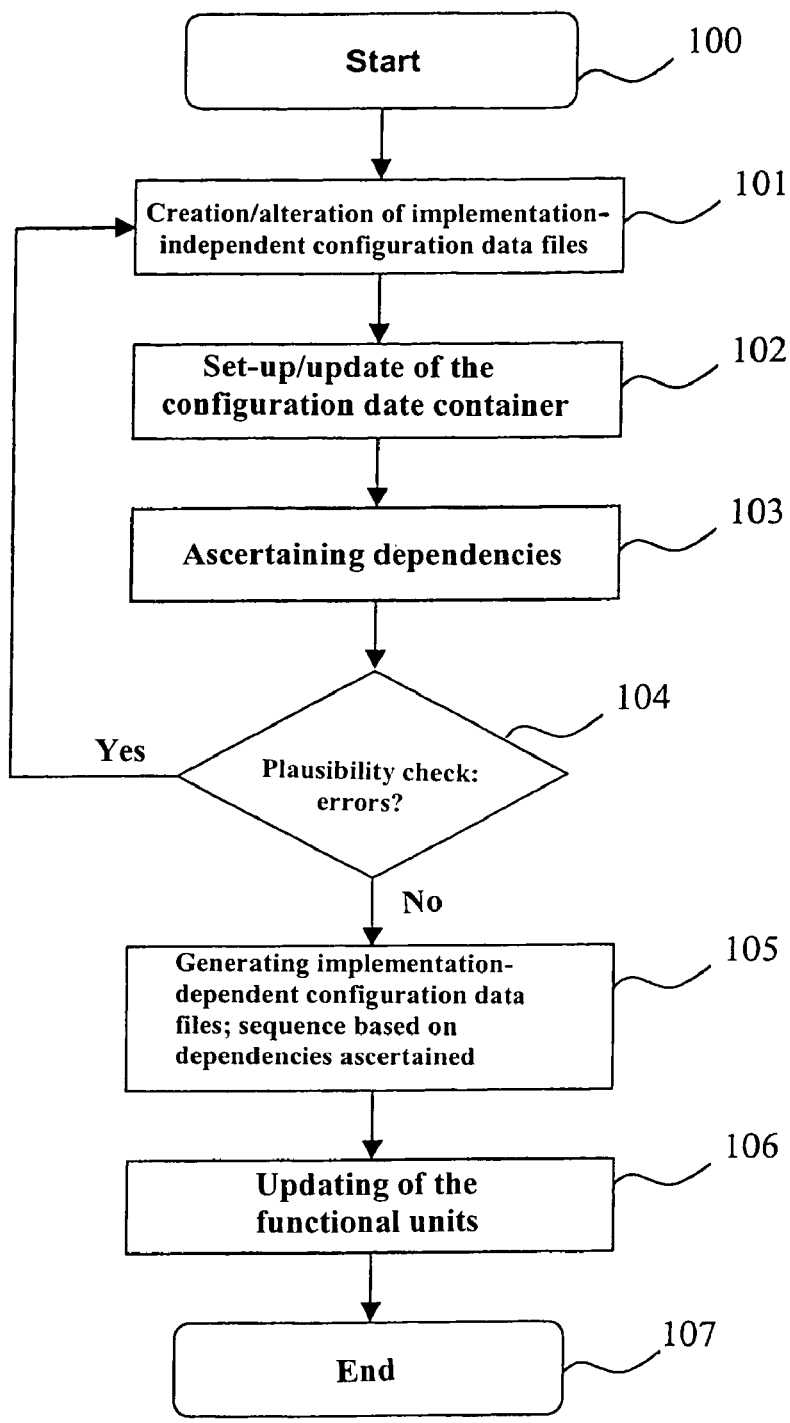
FIG. 2 shows a schematic flow chart of a specific embodiment of the method according to the present invention.

The flow chart of a method according to the present invention for configuring a computer program shown in FIG. 2 starts at a step 100. In a step 101, implementation-independent configuration data files 1 are created or altered. Implementation-independent configuration data files 1 have the special distinction that, using the information stored therein, it is possible to describe concrete configuration values or configuration parameters in abstract fashion. For instance, concrete configuration values may define the measuring range of a sensor module for measuring an electric voltage. Illustratively, it is possible to specify a measuring range abstractly with the values 3-5 volts. However, the implementation-dependent values of the measuring range to be generated therefrom, in the manner functional unit 8 to be configured expects, may lie between 10,000 and 20,000, for example. In this case, a computer-program functional unit 8 controlling the sensor module would have to be configured using the concrete configuration values 10,000 and 20,000, for instance, to permit a measurement in a measuring range of 3-5 volts.

Implementation-independent configuration data files 1 created or altered in step 101 are created, for example, in an XML-based format. Such a format makes it particularly easy to achieve a lucid structuring of implementation-independent configuration data files 1. This increases the readability of implementation-independent configuration data files 1 and simplifies the alteration of implementation-independent configuration data files 1, e.g., because configuration data to be altered can be quickly found. It is possible to provide only one implementation-independent configuration data file, even for a particularly large computer program requiring a multitude of configuration data for its configuration. In this context, the information filed in implementation-independent configuration data file 1 is able to be structured using suitable XML structures. However, it is especially advantageous to provide a plurality of implementation-independent configuration data files. For instance, each of these implementation-independent configuration data files 1 may be assigned to one or more functional units 8. It is thereby possible to create or alter the implementation-independent configuration data files in a particularly clear manner. In addition, reusability of individual implementation-independent configuration data files is thereby increased. This is especially advantageous for projects in which individual functional units 8 of the source code are also to be reused.

In step 102, configuration data container 3 is set up or updated. This is accomplished by processing the instructions listed in script 2. Script 2 first causes independent configuration data files 1 to be input. If implementation-independent configuration data files 1 are based on a structured format, e.g., an XML-based format, then a syntactic and/or semantic analysis of the contents of implementation-independent configuration data files 1 may be carried out particularly well using script 2. Consequently, errors, for instance, in the specifying of configuration data may be recognized. Preferably, the XML-based format of implementation-independent configuration data files 1 has a hierarchical structure that is advantageously oriented to the structure of functional units 8 themselves, their dependencies and/or their thematic closeness. Errors in the set-up of this hierarchical structure, and therefore also in the set-up of the source code itself may be recognized using script 2.

Errors found are advantageously handled in step 102. This may be accomplished, for example, by the output of error information. It is equally conceivable to use stochastic methods to remove errors.

In step 102, script 2 extracts the configuration data present in implementation-independent configuration data files 1 and stores it in configuration data container 3. Configuration data container 3 may be in the form of a database, for example. It is likewise conceivable to realize configuration data container 3 as data structure, provided in a storage area, within the software system of the present invention, in so doing, it being ensured that script 2 has writing and reading access to the configuration data stored in configuration data container 3.

In a step 103, dependencies are ascertained. For example, one such dependency may describe which functional units 8 of the computer program must actually be processed in the case of the present configuration. With the aid of these dependencies, it is possible to decide whether, in one of the following steps, it is necessary to generate an implementation-dependent configuration data file for a specific functional unit 8 at all. Dependencies may further describe which concrete configuration data are dependent on which abstract configuration data. Thus, it is conceivable that the change of an abstract configuration datum in an implementation-independent configuration data file will bring about a change in a plurality of concrete configuration data.

Dependencies may also arise if further scripts 4 on their part alter configuration container 3. Thus, the correct activation sequence of scripts 4 must be ascertained and stored. Dependencies may also describe relationships between one or more hardware components and individual configuration data. This makes it possible to recognize, for instance, whether a configuration provided is actually executable on specific hardware.

In step 104, a plausibility check is carried out. In so doing, especially based on the dependencies ascertained in step 103, it is checked whether the configuration predefined with the aid of implementation-independent configuration data files 1 has errors. If this is the case, there is a branch back to step 101 in which a change is made in implementation-independent configuration data files 1 with the aim of eliminating errors. If no errors are recognized in step 104, there is a branching to step 105.

In step 105, implementation-dependent configuration data files 5 are generated. To that end, first of all the configuration data stored in configuration data container 3 is retrieved with the aid of a script 4 or a plurality of scripts 4. In the present exemplary embodiment, scripts 4 are in the form of Perl scripts. Abstract configuration data, stored in particular in configuration data container 3, is converted by scripts 4 into concrete configuration data, which is then filed in implementation-dependent configuration data files 5. In so doing, preferably the dependencies ascertained in step 103 are used, as well.

For example, implementation-dependent configuration data files 5 generated in step 105 may be header files (file_.h, file_2.h, file_3.h in FIG. 1). In the same way, generated implementation-dependent configuration data files 5 may also contain source code (file_2.c, file_k.c in FIG. 1). Typically, the concrete configuration data generated by scripts 4 from the abstract configuration data is realized by value assignments for variables and/or function parameters, and as instructions in a programming language. In this context, the programming language corresponds to the programming language in which functional units 8 of computer program 7 are coded. For example, if functional units 8 of computer program 7 are coded in programming language C++, then the concrete configuration data may be realized by so-called #define instructions, for instance, or by the definition of constant variables. Depending on the configuration data stored in configuration data container 3, it is also possible with the aid of scripts 4 to generate functions which assume complex tasks—such as the initialization of hardware components, or checking for the presence of individual software components or hardware components—and are themselves realized as source code in a higher programming language. This source code may then be stored in one or more implementation-dependent configuration data files (file_2.c, file_k.c in FIG. 1). For that purpose, for example, a script 4 may contain a so-called template, made up, for instance, of instructions in C++, which are updated as a function of the configuration data stored in configuration data container 3, and are filed in an implementation-dependent configuration data file 5.

In step 107, functional units 8 of computer program 7 are updated. For example, this may be accomplished by the automatic call-up of a compiler 6 which translates functional units 8, existing in a source code, into a machine code. To that end, compiler 6 reads in implementation-dependent configuration data files 5 and controls the generation of the machine code as a function of the concrete configuration data filed in implementation-dependent configuration data files 5. It is also conceivable that one or more functional units 8 already exist in machine code. In this case, the compiler may, for instance, translate the source code (file_2.c, file_k.c in FIG. 1), generated by scripts 4, into machine code, taking the header files (file_1.h, file_2.h, file_3.h) into account, and link the machine code thus translated to the machine code representing functional units 8 with the aid of a so-called linker assigned to compiler 6.

The method ends in step 108. In this step, computer program 7 is configured in such a way that the concrete configuration data, filed in the implementation-independent configuration data files, is taken into account in the machine code generated.

Of course, it is possible for script 2 and/or scripts 4 to be written in another script language, or to be developed as executable programs.

The execution steps shown in FIG. 2 may, of course, vary, and the processing sequence may be partially altered. Thus, it is conceivable for plausibility check 104 to be carried out by one or more of scripts 4.

In particular, the method may also start out from one or more implementation-independent configuration data files; have one or more scripts 2 that, for instance, are executed consecutively; have one or more scripts 4, each generating one or more implementation-dependent configuration data files 5; and of course, computer program 7 may have one or more functional units 8. Using the method of the present invention, it is possible, in particular, to recognize whether one or more of functional units 8 actually come to be used in the configuration predefined by the implementation-independent configuration data files. If this is not the case, it can be recognized by a software tool (not shown), assigned to configuration data container 3. This makes it possible that such a functional unit 8 is not configured, and with the aid of implementation-dependent configuration data files 5, compiler 6 is induced not to import functional unit 8 into the machine code to be generated. The method of the present invention may thereby be carried out particularly rapidly. The machine code generated by a computer program, which was configured using the method of the present invention, may be especially compact and therefore is able to save memory space.

There is the possibility of script 2 itself already bringing about the generation of one or a plurality of implementation-dependent configuration data files 5. The method of the present invention may thereby be carried out particularly rapidly. For example, this may be advantageous for abstract configuration data that has no dependencies and differs from the concrete configuration data.

What is claimed is:

1. A method for configuring a computer program including at least one functional unit, comprising:
   at least one of:
      creating at least one implementation-independent configuration data file, and
      altering information filed in the at least one implementation-independent configuration data file;
      wherein the information stored in each implementation-independent configuration data file describes concrete configuration values, using corresponding abstract configuration values whose values are different from the values of the corresponding concrete configuration values, wherein the concrete configuration values are used by a respective at least one functional unit;
   using a computer script, at least one of automatically setting-up and automatically updating configuration data, stored in a configuration data container, as a function of the information filed in the at least one implementation-independent configuration data file, wherein the configuration data includes the abstract configuration values, which are extracted from the implementation-independent configuration data file and stored in the configuration data container;
   automatically generating at least one item of dependency information describing a dependency on at least two configuration data present in the configuration data container;
   automatically generating at least one implementation-dependent configuration data file as a function of the configuration data stored in the configuration data container, and as a function of the at least one item of dependency information, wherein the abstract configuration values from the data container are converted into their corresponding concrete configuration values, which are stored in the implementation-dependent configuration data file; and
   automatically configuring the at least one functional unit as a function of the concrete configuration values stored in the at least one implementation-dependent configuration data file, wherein each of the automated steps above are performed at a processor of a computer.

2. The method as recited in claim 1, further comprising:
   creating a plurality of implementation-independent configuration data files; and
   assigning each of the implementation-independent configuration data files to a different functional unit from a plurality of functional units that form the at least one functional unit.

3. The method as recited in claim 1, further comprising:
   generating a plurality of implementation-dependent configuration data files, and
   assigning each of the implementation-dependent configuration data files to a different functional unit from a plurality of functional units that form the at least one functional unit.

4. The method as recited in claim 3, wherein each implementation-dependent configuration data file is generated as a function of at least one property of hardware on which an installation of at least a portion of the configured computer program is to be made possible.

5. The method as recited in claim 4, wherein each implementation-dependent configuration data file is generated as a function of a result of a plausibility check in which it is determined:
   whether the hardware is capable of providing data required by a respective assigned functional unit; and
   whether a resource required by the respective assigned functional unit is available.

6. The method as recited in claim 3, further comprising:
   automatically creating a documentation that describes the information filed within at least one of the at least one implementation-independent configuration data file and the at least one implementation-dependent configuration data file.

7. The method as recited in claim 1, wherein the at least one implementation-independent configuration data file is created in an XML-based format.

8. The method as recited in claim 1, further comprising:
   automatically determining, as a function of the configuration data, whether a functional unit included by the computer program is needed by the computer program, wherein the functional unit is only configured if the functional unit is needed by the computer program.

9. A non-transitory computer readable storage medium storing a software system for configuring a computer program including at least one functional unit, the software system comprising:
   at least one implementation-independent configuration data file, wherein information stored in each implementation-independent configuration data file describes concrete configuration values, using corresponding abstract configuration values whose values are different from the values of the corresponding concrete configuration values, wherein the concrete configuration values are used by a respective at least one functional unit;
   at least one of:
      a configuration data container including configuration data, and
      an arrangement for creating the configuration data container as a function of information filed in the at least one implementation-independent configuration data file;
      wherein the configuration data includes the abstract configuration values,
   which are extracted from the implementation-independent configuration data file and stored in the configuration data container;
   an arrangement that includes a computer script for at least one of altering and reading out configuration data from the configuration data container;

an arrangement for automatically generating at least one item of dependency information describing a dependency on at least two configuration data present in the configuration data container;

an arrangement for automatically generating at least one implementation-dependent configuration data file as a function of configuration data stored in the configuration data container, and as a function of the at least one item of dependency information, wherein the abstract configuration values from the data container are converted into their corresponding concrete configuration values, which are stored in the implementation-dependent configuration data file; and an arrangement for automatically configuring the at least one functional unit as a function of the concrete configuration values stored in the implementation-dependent configuration data file.

10. The storage medium as recited in claim 9, the software system further comprising:

an arrangement for at least one of:
creating the at least one implementation-independent configuration data file, and
altering information filed in the at least one implementation-independent configuration data file;

an arrangement for at least one of automatically setting-up and automatically updating configuration data, stored in the configuration data container, as a function of the information filed in the at least one implementation-independent configuration data file;

an arrangement for automatically generating at least one implementation-dependent configuration data file as a function of the configuration data stored in the configuration data container, by converting the abstract configuration values from the data container into their corresponding concrete configuration values, which are stored in the implementation-dependent configuration data file; and an arrangement for automatically configuring the at least one functional unit as a function of the concrete configuration values stored in the at least one implementation-dependent configuration data file.

11. The storage medium as recited in claim 9, wherein the storage medium is one of a random access memory, a read-only memory, and a flash memory.

12. The storage medium as recited in claim 9, wherein the storage medium is one of a digital versatile disk, a compact disk, and a hard disk.

13. A computing element having a microprocessor and being programmed with software that when executed results in a performance of the following:

at least one of:
creating at least one implementation-independent configuration data file, and
altering information filed in the at least one implementation-independent configuration data file;
wherein information stored in each implementation-independent configuration data file describes concrete configuration values, using corresponding abstract configuration values whose values are different from the values of the corresponding concrete configuration values, wherein the concrete configuration values are used by a respective at least one functional unit;

using a computer script, at least one of automatically setting-up and automatically updating configuration data, stored in a configuration data container, as a function of the information filed in the at least one implementation-independent configuration data file, wherein the configuration data includes the abstract configuration values, which are extracted from the implementation-independent configuration data file and stored in the configuration data container;

automatically generating at least one item of dependency information describing a dependency on at least two configuration data present in the configuration data container;

automatically generating at least one implementation-dependent configuration data file as a function of the configuration data stored in the configuration data container, and as a function of the at least one item of dependency information, wherein the abstract configuration values from the data container are converted into their corresponding concrete configuration values, which are stored in the implementation-dependent configuration data file; and automatically configuring the at least one functional unit as a function of the concrete configuration values stored in the at least one implementation-dependent configuration data file.

14. The computing element as recited in claim 13, wherein the computing element corresponds to a control device.

15. A method for configuring a computer program including at least one functional unit, comprising:

at least one of:
creating at least one implementation-independent configuration data file, and
altering information filed in the at least one implementation-independent configuration data file;
wherein information stored in each implementation-independent configuration data file describes concrete configuration values, using corresponding abstract configuration values whose values are different from the values of the corresponding concrete configuration values, wherein the concrete configuration values are used by a respective at least one functional unit;

using a computer script, at least one of automatically setting-up and automatically updating configuration data, stored in a configuration data container, as a function of the information filed in the at least one implementation-independent configuration data file, wherein the configuration data includes the abstract configuration values, which are extracted from the implementation-independent configuration data file and stored in the configuration data container;

automatically generating at least one item of dependency information describing a sequence in which additional computer scripts, which alter the configuration data stored in the configuration data container, must be executed;

automatically generating at least one implementation-dependent configuration data file as a function of the configuration data stored in the configuration data container, and as a function of the at least one item of dependency information, wherein the abstract configuration values from the data container are converted into their corresponding concrete configuration values, which are stored in the implementation-dependent configuration data file; and automatically configuring the at least one functional unit as a function of the concrete configuration values stored in the at least one implementation-dependent configuration data file, wherein each of the automated steps above are performed at a processor of a computer.

16. A method for configuring a computer program including at least one functional unit, comprising:

at least one of:
- creating at least one implementation-independent configuration data file, and
- altering information filed in the at least one implementation-independent configuration data file;

wherein information stored in each implementation-independent configuration data file describes concrete configuration values, using corresponding abstract configuration values whose values are different from the values of the corresponding concrete configuration values, wherein the concrete configuration values are used by a respective at least one functional unit;

using a computer script, at least one of automatically setting-up and automatically updating configuration data, stored in a configuration data container, as a function of the information filed in the at least one implementation-independent configuration data file, wherein the configuration data includes the abstract configuration values, which are extracted from the implementation-independent configuration data file and stored in the configuration data container;

automatically generating at least one item of dependency information describing whether a particular resource is reserved exclusively for use by the at least one functional unit, which comprises a software module in the computer program;

automatically generating at least one implementation-dependent configuration data file as a function of the configuration data stored in the configuration data container, and as a function of the at least one item of dependency information, wherein the abstract configuration values from the data container are converted into their corresponding concrete configuration values, which are stored in the implementation-dependent configuration data file; and automatically configuring the at least one functional unit as a function of the concrete configuration values stored in the at least one implementation-dependent configuration data file, wherein each of the automated steps above are performed at a processor of a computer.

* * * * *

UNITED STATES PATENT AND TRADEMARK OFFICE
CERTIFICATE OF CORRECTION

PATENT NO. : 8,365,163 B2  Page 1 of 1
APPLICATION NO. : 10/588596
DATED : January 29, 2013
INVENTOR(S) : Schenk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1490 days.

Signed and Sealed this
First Day of September, 2015

Michelle K. Lee
*Director of the United States Patent and Trademark Office*